US 7,486,529 B2

(12) United States Patent
Sukup

(10) Patent No.: US 7,486,529 B2
(45) Date of Patent: Feb. 3, 2009

(54) SWITCHING POWER SUPPLY CONTROLLER WITH IMPROVED EFFICIENCY AND METHOD THEREFOR

(75) Inventor: Frantisek Sukup, Zasova (CZ)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 340 days.

(21) Appl. No.: 11/337,236

(22) Filed: Jan. 23, 2006

(65) Prior Publication Data
US 2007/0171683 A1    Jul. 26, 2007

(51) Int. Cl.
H02M 3/335    (2006.01)
(52) U.S. Cl. ............... 363/49; 323/901; 363/21.08
(58) Field of Classification Search ............ 363/49, 363/21.08, 21.04, 21.12, 21.16; 323/901
See application file for complete search history.

(56) References Cited

U.S. PATENT DOCUMENTS

| 6,069,805 | A  | * | 5/2000 | Anderson, Jr. ........... 363/49 |
| 6,111,762 | A  | * | 8/2000 | Igarashi et al. ......... 363/21.16 |
| 6,236,194 | B1 | * | 5/2001 | Manabe et al. ......... 323/274 |
| 6,392,906 | B2 | * | 5/2002 | L'Hermite et al. ...... 363/97 |
| 6,775,164 | B2 | * | 8/2004 | Wong et al. ............ 363/147 |
| 6,906,934 | B2 | * | 6/2005 | Yang et al. ............. 363/49 |

OTHER PUBLICATIONS

Data Sheet "LM 1 36-2.5/LM236-2.5/LM336-2.5V Reference Diode", Jun. 2005, National Semiconductor Corporation DS005715, Copryright 2005, 12 pps.
Data Sheet "LM329 Precisin Reference", Jun. 2005, National Semiconductor Corporation DS005714, Copyright 2005, 6 pps.
Advance Information data sheet "MC44608 Few External Components Reliable and Flexible GreenLine Very High Voltage PWM Controller", MC44608/D Rev 0, Jul. 1999, Motorola, Inc., 16 pps.
Publication "Coolset the coolest couple out there, Control IC and Powerstae for Highly Efficient witched Mode Power Supplies" Infineon Technologies AG, No. B152-H7643-X-X-7600 PS05005 ZP20361., 6 pps.
Datasheet Version 0.0, Sep. 23, 2004, CoolSET-F2 ICE2A380P2, Off-Line SMPS Current Mode Controller with integrated 800v CoolMOS, Power Management Supply, Infineon Technologies AG, Edition Sep. 23, 2004, 20 pps.

* cited by examiner

Primary Examiner—Akm E Ullah
Assistant Examiner—Harry Behm
(74) Attorney, Agent, or Firm—Robert F. Hightower

(57) ABSTRACT

In one embodiment, a switching power supply controller decouples the power supply controller from receiving a sense signal during one portion of the operation of the power supply controller and couples the switching power supply controller to receive the sense signal during another portion of the operation.

15 Claims, 3 Drawing Sheets

SWITCHING POWER SUPPLY CONTROLLER WITH IMPROVED EFFICIENCY AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form switching power supply controllers that regulated the value of an output voltage of a power control system. In some applications, the power to operate the switching power supply controller was derived from an auxiliary winding of a transformer. In such an application, the amount of power consumed by the switching power supply controller was greater than a desired value. Additionally, in some cases the range of the input voltage to the switching power supply controller was limited which reduced the useful operating voltage range of the switching power supply controller.

Accordingly, it is desirable to have a switching power supply controller that has reduced power dissipation, and that facilitates a wider operating range of the input voltage.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
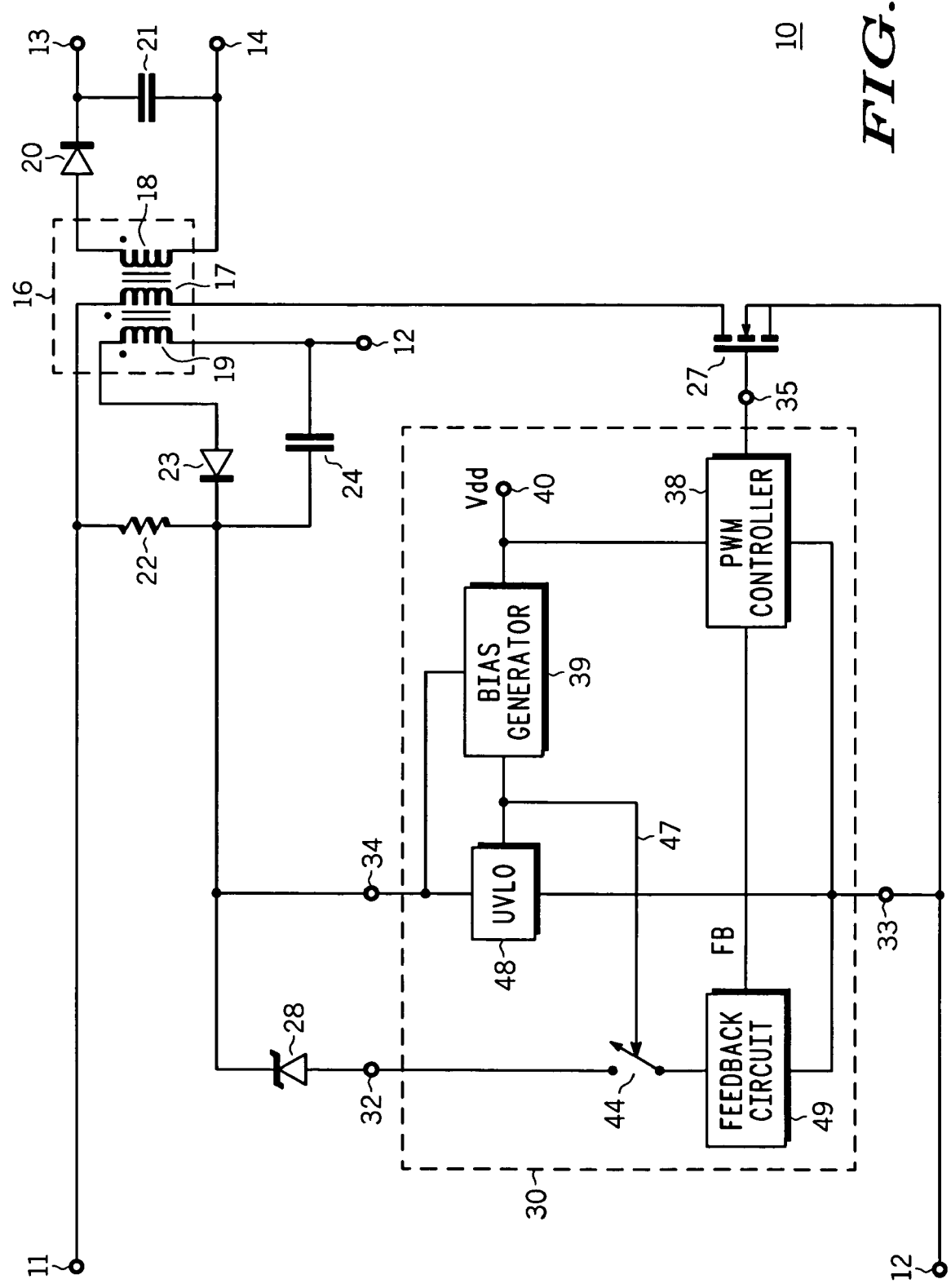
FIG. 1 schematically illustrates an embodiment of a portion of a power supply control system having a switching power supply controller in accordance with the present invention.

FIG. 1 schematically illustrates an embodiment of a portion of a power supply control system 10 that includes an exemplary block diagram embodiment of a portion of a switching power supply controller 30. Switching power supply controller 30 is configured to reduce the amount of power required to operate system and especially reduce the power dissipation during a start-up phase of operating controller 30 and to also increase the useable range of the operating voltage supplied to controller 30. System 10 generally receives input power from a bulk input voltage that is applied between an input terminal 11 and a return terminal 12, and provides an output voltage between a voltage output 13 and a voltage return 14. Controller 30 is configured to regulate the value of the output voltage to a target value within a desired range of values. For example the target value may be five volts (5 V) and the desired range maybe plus or minus five percent (5%) of the target. System 10 usually includes a transformer 16 that includes a primary winding 17, a secondary winding 18, and an auxiliary winding 19. A rectifying diode 20 and a filter capacitor 21 may be connected to secondary winding 18 to assist in forming the output voltage. Auxiliary winding 19 generally is used to assist in forming an input voltage for controller 30 that can be used as a first operating voltage for operating at least a portion of controller 30. A capacitor 24, a resistor 22, and a diode 23 may be connected to auxiliary winding 19 to assist in providing an external voltage source for forming the input voltage for controller 30 as will be seen further hereinafter. A power switch, such as a power transistor 27, usually is connected to primary winding 17 in order to facilitate controller 30 regulating the value of the output voltage. Although transistor 27 is illustrated to be external to controller 30, in some embodiments transistor 27 may be internal to controller 30. A voltage regulator 28, illustrated in this exemplary embodiment as a zener diode, generally is used to provide a sense signal to controller 30 that is representative of the value of the output voltage. Controller 30 is configured to receive the sense signal on a sense input 32. As will be seen further hereinafter, after the start-up of controller 30, voltage regulator 28 is also used to regulate the maximum value of the input voltage to a value that does not damage controller 30. Those skilled in the art will appreciate that regulator 28 may be any type of device that with a voltage-current characteristic that is similar to that of a zener diode. Examples of such devices include the LM329 and LM136 that are available from National Semiconductor, Inc. of Santa Clara, Calif.

Controller 30 is configured to receive the input voltage or first operating voltage for operating controller 30 between a voltage input 34 and a voltage return 33. Controller 30 generally includes a PWM controller 38 that is used to form a PWM switching signal on a PWM output 35 of controller 30. Controller 38 generates the PWM switching signal to regulate the value of the output voltage to within the desired range. Controller 38 can be any of a variety of different PWM controllers including a fixed frequency current mode PWM controller, a fixed frequency voltage mode PWM controller, a hysteretic controller, or other various types of PWM controllers that are well known to those skilled in the art. Controller 38 may include other well know PWM controller functions such as soft-start, leading edge blanking, skip-cycle, and over-voltage protection. Controller 30 also includes a first circuit, such as an under-voltage lock out (UVLO) circuit or UVLO 48, that is configured to detect the value of the input voltage from input 34 and a bias generator 39 that is used to generate a second operating voltage or internal operating voltage (Vdd) that is used by some other portions of controller 30, such as controller 38, as an operating voltage. UVLO 48 and bias generator 39 are connected between input 34 and return 33 to receive the first operating voltage or input voltage. During the start-up of controller 30, UVLO 48 monitors the value of the input voltage and prevents controller 30 from generating the internal operating voltage (Vdd) if the value of the input voltage is less than a start-up value that is required for initiating operation of controller 30. A switch 44 of controller 30 also decouples controller 30 from receiving the sense signal from voltage regulator 28 during this start-up portion of operating controller 30.

In operation, the bulk voltage received between terminals 11 and 12 may be much greater than is needed to operate controller 30 and system 10. For example, the voltage applied between terminals 11 and 12 may be one hundred volts (100 V) or greater and the target value of the output voltage may be approximately five volts (5 V). During the start-up operation of system 10, capacitor 24 is discharged and the bulk voltage received between terminals 11 and 12 begins charging capacitor 24 through resistor 22. UVLO 48 monitors the value of the input voltage and forms a control signal 47 that assists in controlling the start-up operation of controller 30. As capacitor 24 is charging, UVLO 48 negates control signal 47 until the value of the input voltage received from capacitor 24 is greater than the start-up value required for initiating operation of controller 30. For example, the normal range of the input voltage for operating controller 30 may be between ten and twelve volts (10-12 V) and UVLO 48 may not allow controller 30 to begin operating until the input voltage reaches a start-up value of about fifteen volts (15V). Generator 39 receives the negated control signal 47 which prevents controller 30 from generating Vdd and prevents controller 38 from operating. Switch 44 also receives the negated signal 47 which disables switch 44 to an open state thereby decoupling controller 30 from receiving the sense signal from voltage regulator 28. With switch 44 open, regulator 28 is also inhibited from operating, thus, inhibited from regulating the value of the input voltage. Capacitor 24 continues to charge and when the input voltage is no less than the start-up value, UVLO 48 asserts control signal 47. Asserting control signal 47 enables switch 44 to close thereby coupling controller 30 to receive the sense signal from regulator 28. Closing switch 44 also couples circuit 49 to receive the sense signal from regulator 28 and form a feedback (FB) signal that is representative of the value of the output voltage. Controller 38 uses the FB signal to assist in regulating the value of the output voltage. Asserting control signal 47 also enables bias generator 39 to generate Vdd and subsequently controller 38 begins operating to regulate the value of the output voltage. It should be noted that in some embodiments there may be an additional time delay between UVLO 48 detecting a voltage that allows controller 30 to operate and generator 39 generating Vdd. Such a delay generally is used to ensure that the bias generator elements reach the desired value before operating the other elements of controller 30. As PWM controller 38 generates PWM drive pulses on output 35 to switch transistor 27, auxiliary winding 19 receives power and begins to charge capacitor 24 through diode 23. Thus, PWM controller 38 regulating the output voltage also facilitates charging capacitor 24. Because switch 44 is now closed, regulator 28 is coupled to return 33 thereby enabling regulator 28 to begin regulating the value of the input voltage to a third value that generally is the desired operating range for controller 30. The desired operating range, thus the third value, of the input voltage to controller 30 usually is less than the start-up value to which capacitor 24 is charged. For example, the start-up voltage may be fifteen volts and regulator 28 may limit the third value of the input voltage to no greater than eleven or twelve volts. After UVLO detects the start-up value, UVLO 48 does not negate signal 47 as regulator 28 regulates the value of the input voltage to a lower value. Thus, it can be seen that switch 44 allows the input voltage to vary over a wide range of values. Because switch transistor 45 decouples controller 30 from receiving the sense signal, the value of the voltage to which regulator 28 regulates the input voltage may vary from a value that is much lower than the start-up voltage to a value that is close to the maximum allowable value that can be sustained by controller 30 without causing damage. The lowest value of the input voltage may be close to a minimum value that can be used to operate controller 30. For example, the lowest value may be close to eight volts (8V) and the maximum value may be about twenty volts (20 V). The start-up value may be set to fifteen volts (15 V) and regulator 28 may be selected to have a regulation value anywhere from eight volts to twenty volts (8-20 V).

Without switch 44, regulator 28 would limit the third value of the input voltage to a range that was greater than the start-up voltage thereby decreasing the useful voltage range that may be used for the input voltage. For the example just described, the range would be from greater than fifteen volts to twenty volts (15-20 V). This is much less than the range of eight to twenty volts (8-20 V) of controller 30.

Figure 2:
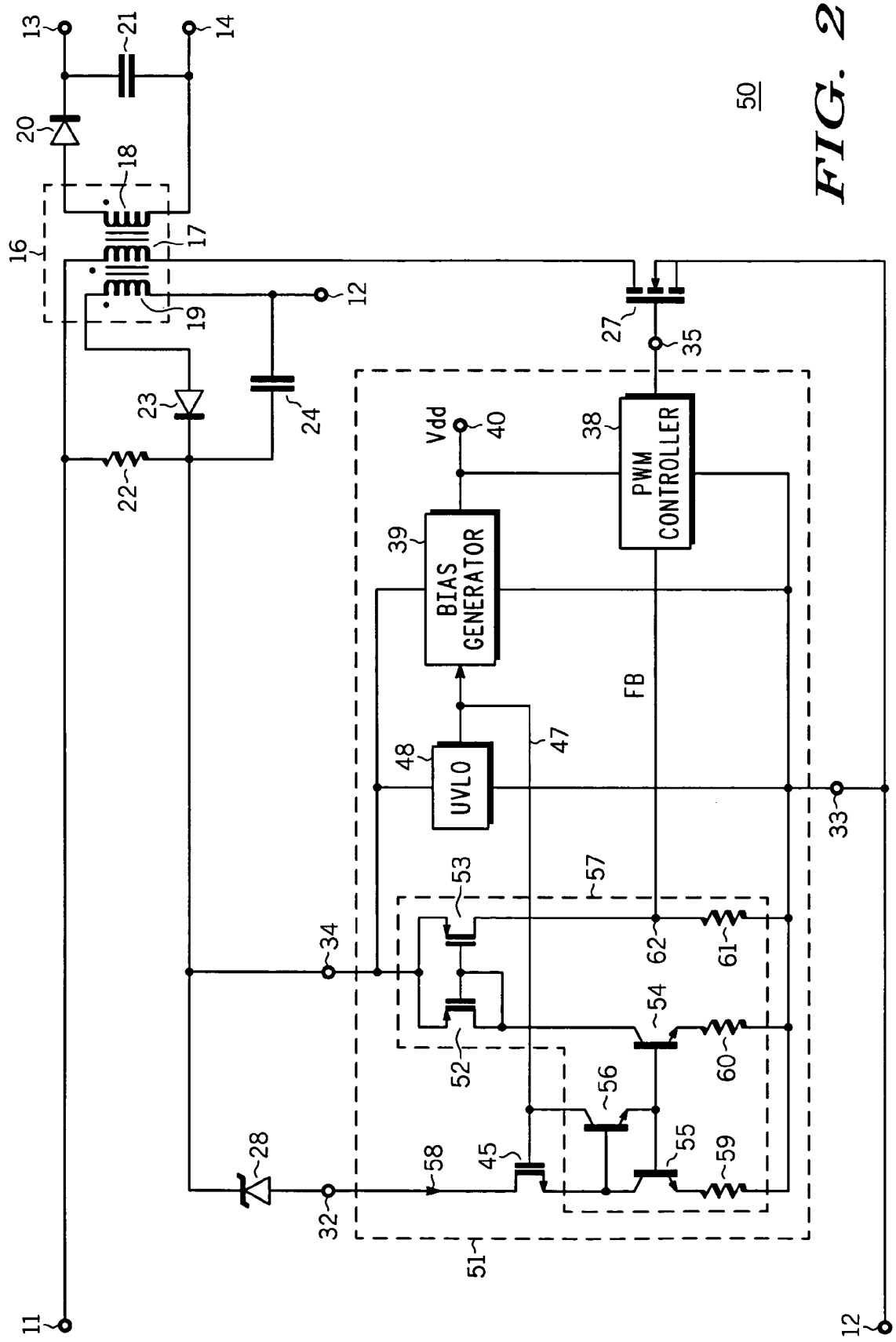
FIG. 2 schematically illustrates an embodiment of a portion of another power supply control system having a exemplary embodiment of another switching power supply controller in accordance with the present invention.

FIG. 2 schematically illustrates an embodiment of a portion of a power supply control system 50 that is an alternate embodiment of system 10 that was explained in the description of FIG. 1. System 50 includes an exemplary embodiment of a portion of a switching power supply controller 51 is a more detailed example embodiment of controller 30 that was explained in the description of FIG. 1. Controller 51 includes a switch transistor 45 that functions similarly to switch 44 and also includes a feedback circuit 57 that functions similarly to circuit 49. Circuit 57 includes current mirror connected transistors 54, 55, and 56 in addition to transistors 52 and 53 that are connected in a second current mirror configuration.

During the start-up operation of controller 51, UVLO 48 forces control signal 47 low which disables transistor 45 thereby decoupling regulator 28 from return 33 and inhibiting controller 51 from receiving the sense signal from regulator 28. The low from signal 47 also disables transistors 56 and 55 thereby disabling circuit 57. As a result, a resistor 61 pulls the FB signal substantially to the value of return 33. When UVLO 48 detects the start-up value of the input voltage, UVLO 48 forces signal 47 high which enables transistor 45. Enabling transistor 45 couples regulator 28 to return 33 through transistor 55 and a resistor 59 thereby coupling controller 51 to receive the sense signal from regulator 28. Transistor 45 also couples the sense signal to transistors 55 and 56 which enables transistors 55 and 56 and forms a current 58 flowing through transistors 45 and 55 and resistor 59. Because regulator 28 is regulating the value of the input voltage, the current through regulator 28 is representative of the value of the input voltage on input 34. Consequently, the value of current 58 is also representative of the value of the input voltage on input 34. The current mirror configuration of transistors 54, 55, and 56 forms a second current flowing through transistor 54 and a resistor 60 that is also representative of the value of the input voltage. The current mirror of transistors 52 and 53 forms another current flowing through transistor 53 and resistor 61 that is also representative of the value of the input voltage. The current flowing through resistor 61 forms a feedback (FB) voltage at a node 62 that is also representative of the value of the input voltage. Thus, circuit 57 converts current 58 into a FB voltage at node 62. Controller 38 receives the feedback voltage and responsively regulates the value of the output voltage between output 13 and return 14.

Those skilled in the art will appreciate that although the operation of controllers 30 and 51 is explained using a zener diode for regulator 28, regulator 28 may be a variety of other types of regulators as described hereinbefore. Also, other circuit configuration may be used to convert current 58 into the voltage for the FB signal. Any circuit that is configured to detect the input voltage increasing to the start-up value may be used instead of UVLO 48.

In order to facilitate this functionality of controller 51, controller 51 is configured to have a first terminal of regulator 28 connected to input 34 and to have a second terminal of regulator 28 connected to input 32. A drain of transistor 45 is connected to input 32 and a source is commonly connected to a base of transistor 56 and a collector of transistor 55. A gate of transistor 45 is connected to receive control signal 47 and to a collector of transistor 56. An emitter of transistor 56 is commonly connected to a base of transistors 54 and 55. An emitter of transistor 55 is connected to a first terminal of resistor 59 which has a second terminal connected to return 33. A collector of transistor 54 is commonly connected to a gate and a drain of transistor 52, and a gate of transistor 53. A source of transistor 52 is commonly connected to a source of transistor 53 and to input 34. A drain of transistor 53 is commonly connected to node 62 and a first terminal of resistor 61. A second terminal of resistor 61 is commonly connected to return 33 and a second terminal of resistor 60.

Those skilled in the art will also appreciate that regulator 28 may also be formed on a semiconductor die along with either of controllers 30 or 51. For such a configuration, controller 30 or 51 receives the input voltage from the source that is external to the respective controller and selectively enables switch 44 or transistor 45 to couple the sense signal to respective controller 30 or 51.

Figure 3:
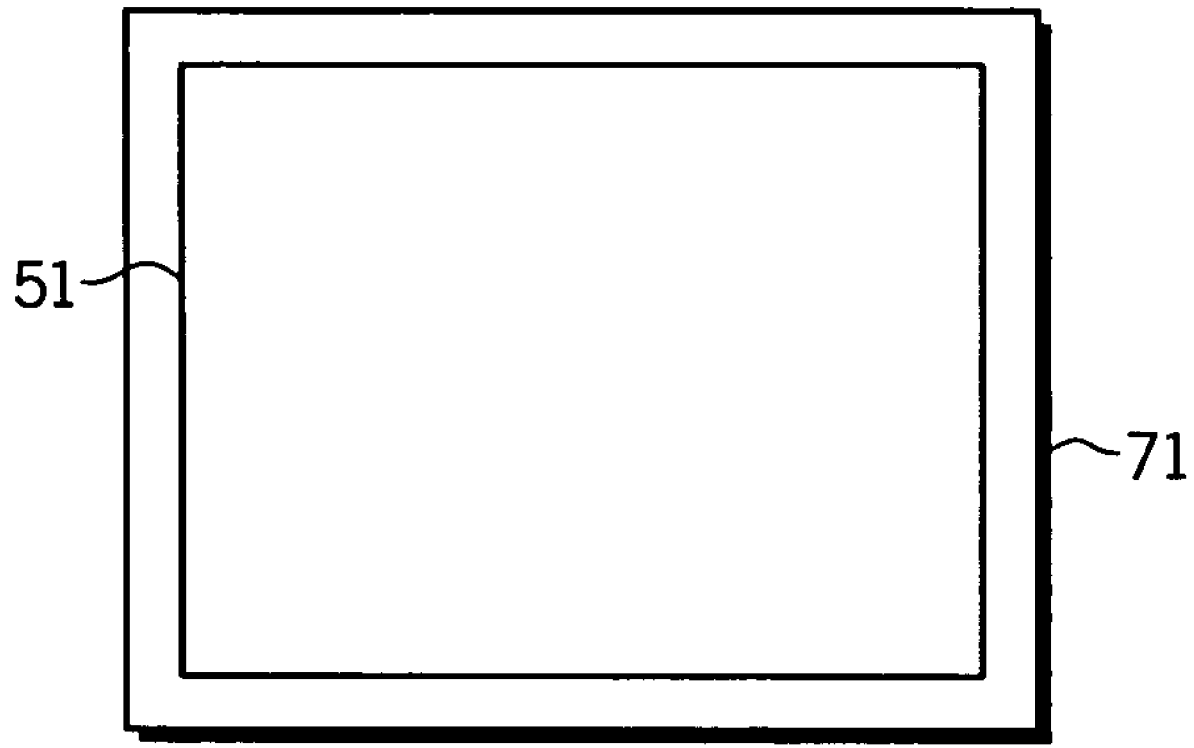
FIG. 3 schematically illustrates an enlarged plan view of a semiconductor device that includes the switching power supply controller of FIG. 2 in accordance with the present invention.

FIG. 3 schematically illustrates an enlarged plan view of a portion of an embodiment of a semiconductor device or integrated circuit 70 that is formed on a semiconductor die 71. Controller 51 is formed on die 71. Die 71 may also include other circuits that are not shown in FIG. 3 for simplicity of the drawing. Controller 51 and device or integrated circuit 70 are formed on die 71 by semiconductor manufacturing techniques that are well known to those skilled in the art.

In view of all of the above, it is evident that a novel device and method is disclosed. Included, among other features, is using a switch to decouple the switching power supply controller from receiving the sense signal from the regulator during the start-up operation of the controller. Such a functionality decreases the power dissipation of the system during the start-up operation. Additionally, using switch 44 or switch transistor 45 allows the value of the input voltage to be a value that is less than the start-up value which increases the useful range of values for the input voltage. Switch 44 or 45 also provides a high impedance during the start-up phase which reduces the power dissipation during the start-up phase.

While the subject matter of the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply controller comprising:
    a first input configured to receive an operating voltage having a first value from a first voltage source that is external to the power supply controller;
    a second input configured to receive a first current from a voltage regulator that is external to the power supply controller wherein the voltage regulator is coupled to receive the operating voltage; and
    a switch configured to receive the first current from the voltage regulator, the switch configured to decouple the power supply controller from receiving the first current,
    a control circuit of the power supply controller configured to monitor a value of the operating voltage and to control the switch, responsively to the value of the operating voltage, to decoupled the power supply controller from receiving the first current until the operating voltage reaches the first value and wherein the control circuit is configured control the switch, responsively to the value of the operating voltage, to couple the power supply controller to receive the first current after the value of the operating voltage reaches the first value wherein the voltage regulator changes the first value of the operating voltage to a second value that is less than the first value responsively to the switch coupling the power supply controller to receive the first current.

2. The power supply controller of claim 1 wherein the voltage regulator regulates the operating voltage to the second value after the switch couples the power supply controller to receive the first current.

3. The power supply controller of claim 2 wherein the voltage regulator is a zener diode having a zener voltage that is less than the first value.

4. The power supply controller of claim 1 further including a circuit coupled to receive the first current from the switch and form a voltage that is representative of the first current.

5. The power supply controller of claim 1 wherein the switch includes a first transistor having a first current carrying electrode coupled to receive the first current, a control electrode coupled to receive a control signal from the control circuit that is used to couple and decouple the power supply controller from receiving the first current, and a second current carrying electrode.

6. The power supply controller of claim 5 further including a second circuit coupled to receive the first current from the first transistor and form a voltage that is representative of the first current.

7. The power supply controller of claim 5 wherein the control circuit includes a second transistor coupled to the first transistor and configured to decouple the power supply controller from receiving the first current wherein the second transistor is also controlled by the control signal.

8. A power supply controller comprising:
    a first input configured to receive an operating voltage from a voltage source that is external to the power supply controller;
    a switch configured to receive a first current from a voltage regulator that is coupled to receive the operating voltage, the switch configured to decouple the power supply controller from receiving the first current until the operating voltage reaches a first value and to couple the power supply controller to receive the first current after the operating voltage reaches the first value, wherein the switch includes a first transistor having a first current carrying electrode coupled to receive the first current, a control electrode coupled to receive a control signal that is used to couple and decouple the power supply controller from receiving the first current, and a second current carrying electrode;
    a second circuit coupled to receive the first current from the first transistor and form a voltage that is representative of the first current wherein the second circuit includes a second transistor having a first current carrying electrode coupled to the control electrode of the first transistor, a control electrode coupled to the second current carrying electrode of the first transistor, and a second current carrying electrode; a third transistor having a first current carrying electrode coupled to the control electrode of the second transistor, a control electrode coupled to the second current carrying electrode of the second transistor, and a second current carrying electrode; and a fourth transistor having a control electrode coupled to the control electrode of the third transistor, a first current carrying electrode, and a second current carrying electrode.

9. The power supply controller of claim 8 further including a first resistor coupled to the second current carrying electrode of the third transistor and a second resistor coupled to the second current carrying electrode of the fourth transistor.

10. The power supply controller of claim 8 further including a current mirror coupled to the second current carrying electrode of the fourth transistor.

11. A method of forming a power supply controller comprising:

configuring the power supply controller to receive an operating voltage having a first value from a voltage source external to the power supply controller and to use the first value of the operating voltage to operate a first circuit of the power supply controller;

configuring a control circuit of the power supply controller to monitor a value of the operating voltage and to control a first switch, responsively to the value of the operating voltage, to decouple the power supply controller from receiving a first current from a voltage regulator that is coupled to receive the operating voltage prior to the value of the operating voltage increasing to the first value; and configuring the control circuit to monitor the value of the operating voltage and to control the first switch, responsively to the value of the operating voltage, to couple the power supply controller to receive the first current from the voltage regulator responsively to the operating voltage increasing to the first value wherein receiving the first current from the voltage regulator causes the voltage regulator to change the first value of the operating voltage to a second value that is less than the first value.

12. The method of claim 11 wherein configuring the power supply controller to receive the operating voltage includes coupling the first switch to receive the first current and to inhibit coupling the first current to other portions of the power supply controller.

13. The method of claim 11 wherein coupling the first switch includes coupling a first transistor of the power supply controller to receive the first current.

14. The method of claim 11 further including coupling a second circuit of the power supply controller to receive the first current from the first switch and form a first voltage that is representative of a value of the first current.

15. The method of claim 14 further including coupling a PWM control block to receive the first voltage from the first circuit and regulate a value of an output voltage responsively to a value of the first voltage.

* * * * *